A. B. KRAEGER.
MECHANICAL MOVEMENT.
APPLICATION FILED APR. 4, 1910.
968,482.
Patented Aug. 23, 1910.
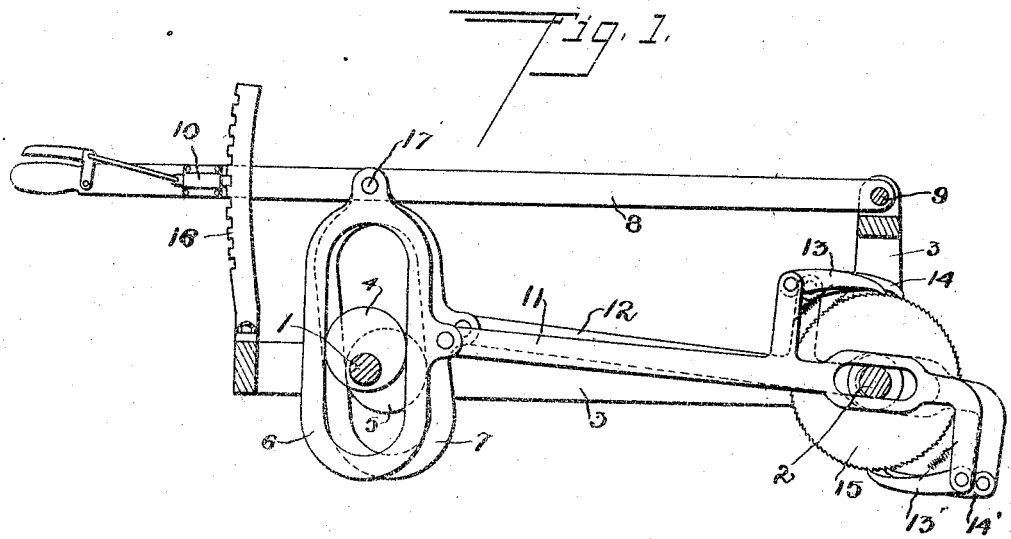
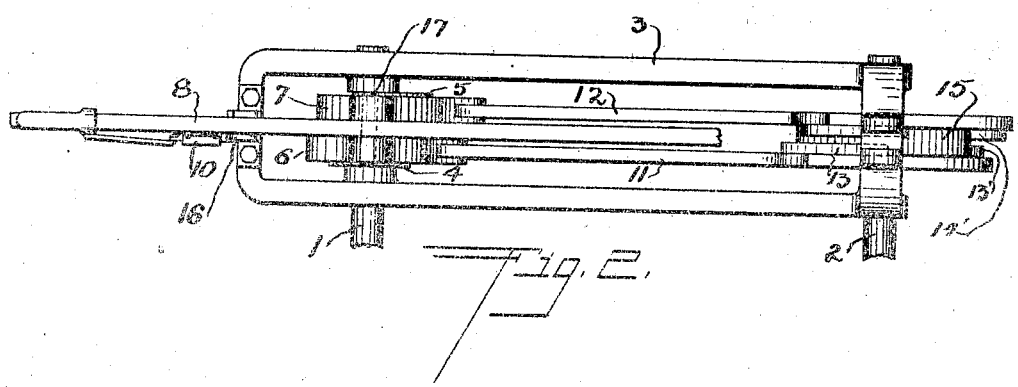

UNITED STATES PATENT OFFICE.

ADAM B. KRAEGER, OF MYNARD, NEBRASKA.

MECHANICAL MOVEMENT.

968,482.  Specification of Letters Patent.  Patented Aug. 23, 1910.

Application filed April 4, 1910. Serial No. 553,359.

*To all whom it may concern:*

Be it known that I, ADAM B. KRAEGER, of the town of Mynard, in the county of Cass, in the State of Nebraska, have invented certain new and useful Improvements in Mechanical Movements, which improvements are described in the following specification and are illustrated by the accompanying drawings.

My invention relates in general to the transmission of power from one rotary shaft to another through intermediate mechanism; and in particular to such transmission with modification of speed.

It is the object of the invention to effect such transmission from a driving shaft which rotates either at a uniform or a variable speed of rotation to a driven shaft which rotates either at an independently variable or uniform speed as may be required. To accomplish this object I incorporate in such intermediate mechanism a pair of adjustable hinged yokes which are actuated from the driving shaft by eccentrics, and a ratchet-wheel, which is fixed upon the driven shaft, and is actuated from said yokes by connecting-rods and pawls. By such intermediate mechanism circular motion at given speed is converted into reciprocating motion of controlled amplitude, or throw, and such reciprocating motion is reconverted into circular motion at a speed which is dependent upon that amplitude.

The best manner in which I have contemplated applying the principles of my invention is illustrated by the said accompanying drawings.

Figure 1 is a side elevation of framework and the operative parts of a mechanical movement which is constructed in accordance with these principles; while Fig. 2 is an incomplete plan of the same.

In these views the numerals 1 and 2 denote respectively the driving shaft and the driven shaft of the said mechanical movement, which have their bearings in a frame 3. Shaft 1 carries duplicate eccentrics 4 and 5, set side by side at an angle of ninety degrees, relatively to each other; while shaft 2 carries a ratchet-wheel 15. An adjustable lever arm 8, which is fulcrumed to frame 3 by pivot 9, and which is provided with a spring catch 10, engaging rack 16, supports by pivot 17 two dependent slotted yokes 6 and 7, side by side, in continual engagement with said eccentrics respectively; while slotted connecting-rods 11 and 12, pivoted to said yokes respectively, and reciprocating on shaft 2, carry respectively the two pairs of spring-actuated pawls, 13 and 13', and 14 and 14', which engage said ratchet-wheel.

By adjustment of catch 10, relative to rack 16, the lever arm 8 is, in operation, adjusted to any desired higher or lower position; and the dependent slotted yokes 6 and 7 are thereby adjusted to a corresponding position relative to the eccentrics 4 and 5, which work therein. According to such adjustment, any desired throw within the structural capacity of the apparatus, is imparted to the connecting-rods 11 and 12; while the pawls 13, 14, 13' and 14', engaging the ratchet-wheel 15 in the order named, and operating in uninterrupted and overlapping succession in that order, impart to that wheel, and thereby to shaft 2, a continuous movement, which is approximately uniform through all parts of each entire revolution, and whose speed, within the same limits of that capacity, is dependent upon the described adjustment of said lever and swinging yokes, relatively to the contained eccentrics 4 and 5.

The transmission of power by means of the described mechanical movement is applicable to various machines, including such agricultural machinery as seeders, feeders, drills, and listers, so-called, in which it is necessary to actuate from a main axle a drill blade or the like at a changeable speed or with varying frequency, according to time, place and purpose.

I claim:—

A driving shaft; two eccentrics, which are set on said shaft, one in advance of the other; two yokes, which swing on a movable pivot, and are engaged by said eccentrics respectively; means of moving said pivot toward and from said driving shaft; a rotary shaft, which is to be driven; a ratchet wheel thereon; two reciprocating rods, which are pivoted to said pivoted yokes respectively; in combination with two pairs of pawls, which are carried by said reciprocating rods respectively, and are arranged to engage said ratchet wheel in uniform succession at each stroke and each return stroke of each of said reciprocating rods.

In testimony whereof I hereunto set my name in the presence of two witnesses.

ADAM B. KRAEGER.

Witnesses:
 WILLARD EDDY,
 E. S. ROOD.